United States Patent [19]

Smith et al.

[11] Patent Number: 5,069,595
[45] Date of Patent: Dec. 3, 1991

[54] LOADER AND CARRIER APPARATUS FOR BOAT AND TRAILER

[76] Inventors: Douglas J. Smith, 342 Osage Ave.; Paul D. Thompson, 1087 W. Pilger, both of Roseburg, Oreg. 97470

[21] Appl. No.: 562,795
[22] Filed: Aug. 6, 1990
[51] Int. Cl.$^5$ .............................................. B60P 3/10
[52] U.S. Cl. .................................. 414/462; 414/559; 414/500
[58] Field of Search .................... 414/462, 559, 500

[56] References Cited

U.S. PATENT DOCUMENTS

| | | | |
|---|---|---|---|
| 3,648,866 | 3/1972 | Slown | 414/462 |
| 3,734,321 | 5/1973 | Long et al. | 414/462 |
| 3,840,133 | 10/1974 | Berg | 414/462 |
| 3,843,002 | 10/1974 | Pihlgren | 414/462 |
| 3,872,989 | 3/1975 | Smithson et al. | 414/462 |

*Primary Examiner*—Robert J. Spar
*Assistant Examiner*—Janice Krizek
*Attorney, Agent, or Firm*—John F. Ingman

[57] ABSTRACT

The loader and carrier apparatus for boat and trailer includes a support framework having two side rail members with stake pocket engaging stubs and a front lower cross member, formed to lay atop and be supported only by the side and front walls of the pickup box. A front top cross member is supported above the front lower cross member. Two rear cross members extend across the pickup box between the side rail members. A guide rail is centrally attached to the rearmost cross member, and extends upward and forward to a central attachment at the front top cross member. A forward support platform is attached to the front end of the guide rail and extends horizontally forward a limited distance to provide for transition between trailer tongue supporting rollers. A first horizontal roller assembly is mounted on, and extends downward from, the trailer tongue, to engage the guide rail and forward support platform. A second horizontal roller assembly is mounted upon the guide rail at its forward, upper end, and is positioned to support the tongue of the trailer when the first horizontal roller assembly is not engaged upon the guide rail or platform. A lateral guide assembly, mounted on the platform, limits lateral movement of the tongue. Detachable ramp assemblies extend from inclined wheel rests to the ground. A guide rail extension extends rearward and downward from the guide rail. A winch assembly utilizes a cable fed through a longitudinal slot in the guide rail for attachment to the trailer.

5 Claims, 4 Drawing Sheets

LOADER AND CARRIER APPARATUS FOR BOAT AND TRAILER

BACKGROUND OF THE INVENTION

1. Field of the Invention

This invention involves a loading and carrying apparatus for boats and trailers on pickup trucks.

2. Description of the Prior Art

Many recreational vehicles, where the living facilities are contained on the primary vehicle chassis, including campers installed on pickup beds, are purchased to enable the user to take along a boat which can be towed on a trailer behind the primary vehicle. An alternative which generally would be less costly and more convenient is the towing of a travel or camping trailer behind a pickup, with the boat and its trailer loaded upon the pickup. For example, such arrangement, the trailer having been located at a camping site, allows the boat and trailer to be unloaded from the pickup and attached to the rear of the pickup for towing to the launching site, and conventional launching.

Previous apparatus has been designed for loading and carrying boats with trailers on pickups trucks. U.S. Pat. No. 3,734,321 discloses a Truck Load Bed Boat Loader and Carrier of similar nature to the present invention. However, this configuration has certain disadvantages which are overcome in the present invention, including a simplified structure and enhanced ability to utilize the pickup when not engaged in carrying a boat and trailer.

What is needed is a loader and carrier which:

a. is able to easily handle a 14- to 16-foot boat upon a standard size pickup truck;

b. provides a traveling position for the boat upon the pickup which is essentially horizontal, allowing gear to be stored inside without elaborate means for securing the gear;

c. is not attached directly to the floor of the pickup box and does not interfere with the original cargo-carrying capacity within the height of the pickup box when configured for boat and trailer carrying;

d. may easily be partially disassembled when not used to load or carry a boat and trailer so as to not interfere with the normal carrying capacity of the Pickup; and e. utilizes improved trailer tongue guidance resulting in a simpler structure with no members extending distractedly forward of the cab when not carrying a boat and trailer.

SUMMARY OF THE INVENTION

The present invention provides a loader and carrier apparatus for boats and trailers on pickup trucks which is designed to meet the aforementioned needs.

Accordingly, the loader and carrier apparatus for boat and trailer, in its preferred embodiment, includes a support framework having two side rail members and a front lower cross member, formed to lay atop and be supported by the side walls and the front wall of the pickup box, respectively. The side rail members include downward extending stubs to engage the standard stake pockets of the side walls. The combination of the side rail members and the front cross member form the only contact and support for the loader and carrier apparatus upon the pickup. A front framework provides a front top cross member supported in a horizontal position above the front lower cross member. Two rear cross members are removably attached to and extend horizontally across the pickup box between the two side rail members proximate their rear end. A guide rail is centrally attached to the rearmost cross member, and extends upward and forward to a central removable attachment at the front top cross member. A forward support platform is attached to the front end of the guide rail, at the junction with the front cross member, and extends horizontally forward a limited distance to provide both a base for a lateral guide assembly and a short runway for trailer tongue supporting rollers.

Two horizontal roller assemblies are utilized to provide support to the tongue of the trailer during loading and unloading. A first horizontal roller assembly is mounted on the forward portion of the tongue of the trailer, and extends downward therefrom to engage the guide rail and platform. A second horizontal roller assembly is mounted upon the guide rail proximate its forward, upper end, and is positioned to support the tongue of the trailer when the first horizontal roller assembly is not engaged upon the guide rail or platform. A smooth transition of the support for the tongue occurs as the first horizontal roller assembly clears or engages the front end of the forward support platform.

The lateral guide assembly is mounted on the forward support platform to provide limits of lateral movement when the tongue is supported by the second horizontal roller assembly, and includes two spaced roller assemblies having vertical axes of rotation which are positioned on opposing sides of the trailer tongue. Two inclined wheel rest plates are positioned on frames supported by the two rear cross members so as to provide support for the trailer wheels when the trailer is fully loaded upon the pickup. A pair of detachable ramp assemblies extend longitudinally from the inclined wheel rest plates to the ground. Each ramp assembly is formed as two mutually detachable members, so that the ramp assemblies may be easily stored within the cargo box of the pickup. A guide rail extension attaches to, and longitudinally extends rearward and downward without further support from, the lower end of the guide rail to a position for engagement with the first horizontal roller assembly. A winch assembly is mounted on the front center member of the front framework, directly below the guide rail, and utilizes a cable fed through a pulley located proximate the function of the guide rail and the front top cross member, and thence rearward, through the guide rail, for attachment of its hook to the trailer near its axle.

DESCRIPTION OF THE PREFERRED EMBODIMENT

Figure 1:
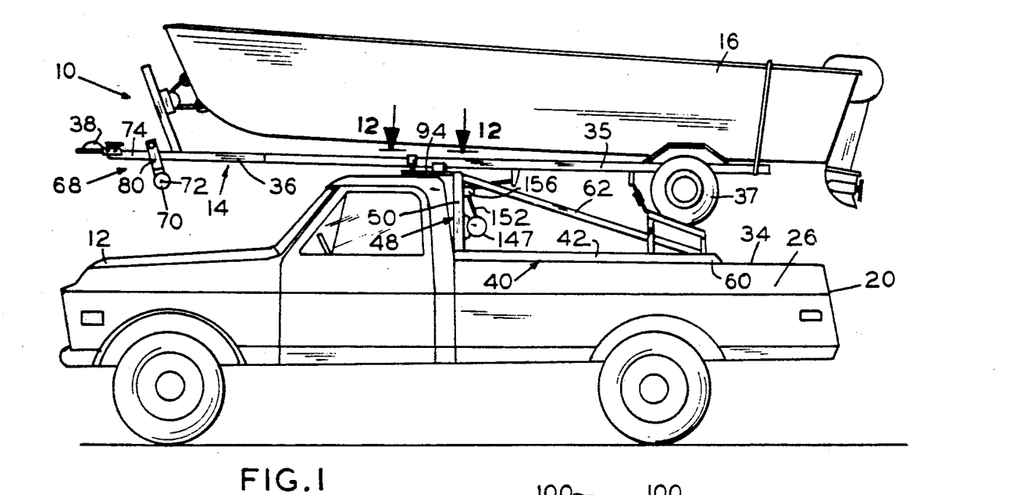
FIG. 1 illustrates a side elevation view of the loader and carrier apparatus with boat and trailer loaded upon pickup truck.
Figure 2:
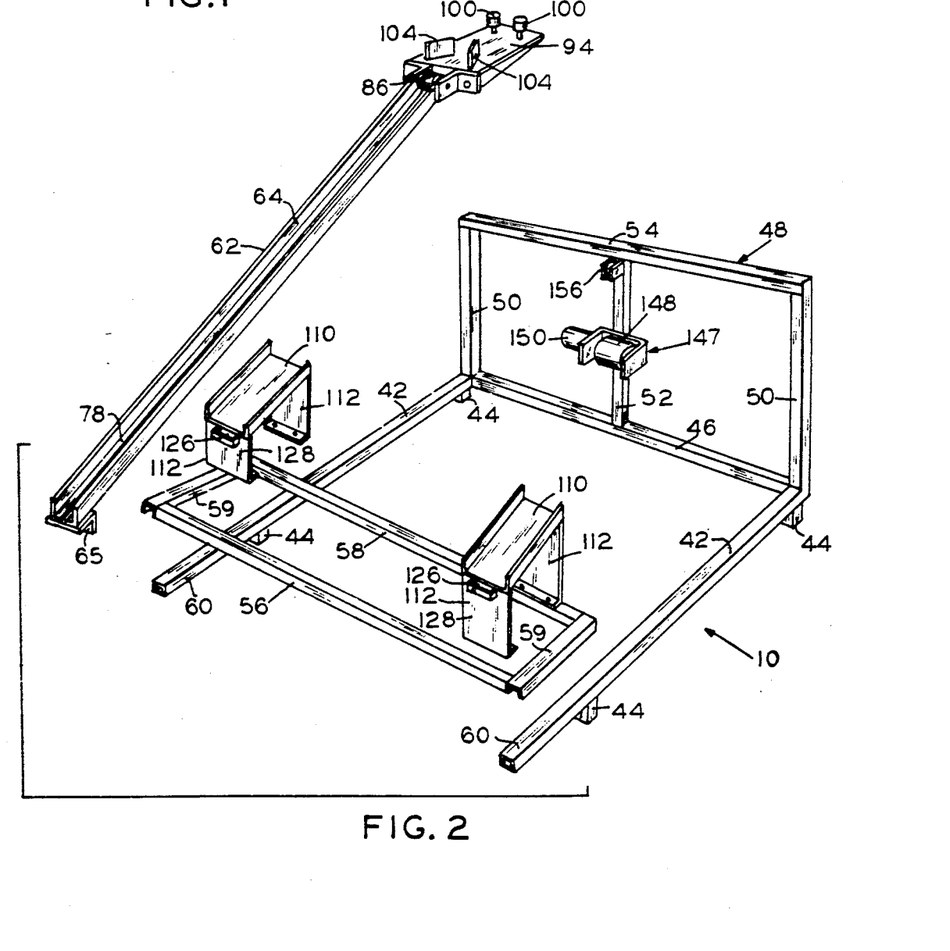
FIG. 2 illustrates a perspective view of the loader and carrier apparatus shown in FIG. 1, showing commonly detached components when the pickup truck is not carrying a boat and trailer.
Figure 3:
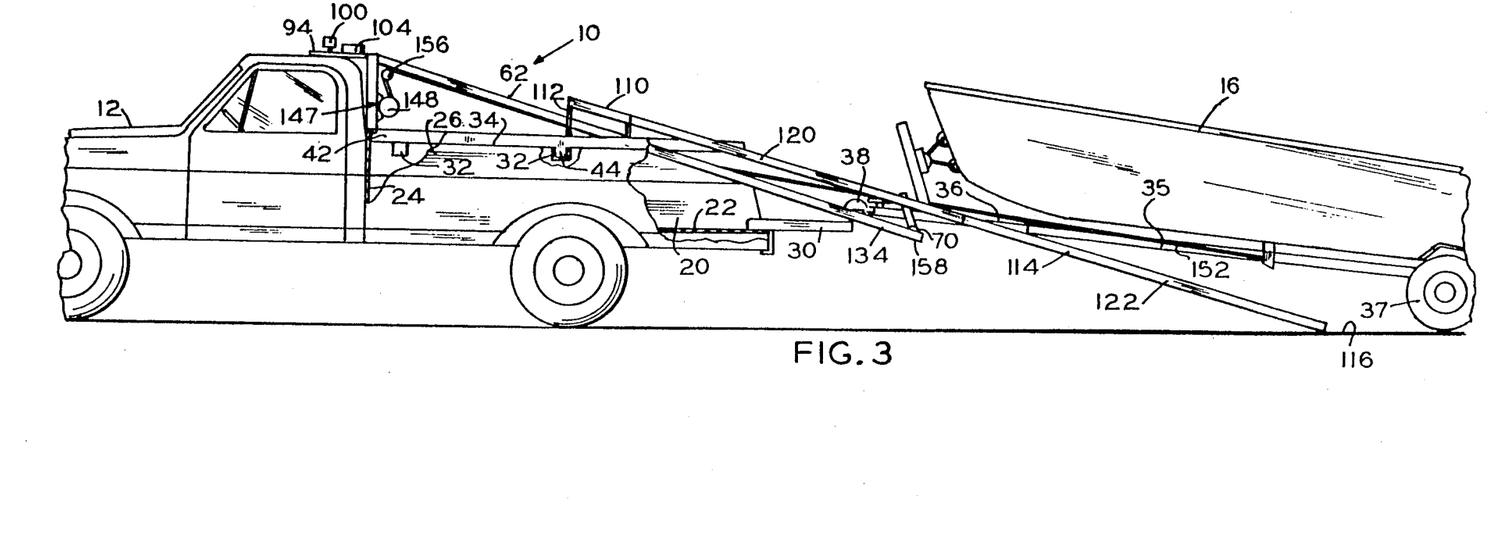
FIG. 3 illustrates a side elevation view of the loader and carrier apparatus, with ramp assemblies and guide rail extension attached, with a boat and trailer at an initial position for loading.
Figure 4:
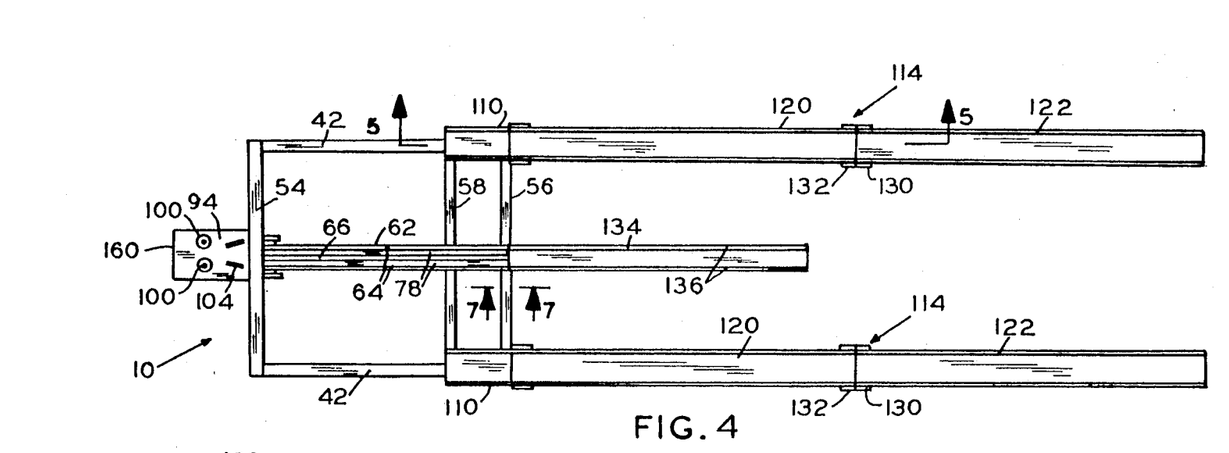
FIG. 4 illustrates a top plan view of the loader and carrier apparatus, with ramp assemblies and guide rail extension attached, as seen in FIG. 3.
Figure 5:
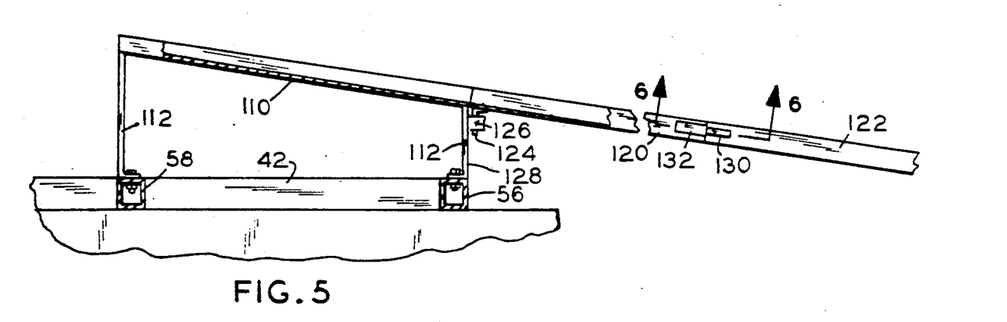
FIG. 5 illustrates a cross sectional view of the wheel rest plates and detachable ramp assemblies as seen at line 5—5 of FIG. 4.
Figures 6, 7:
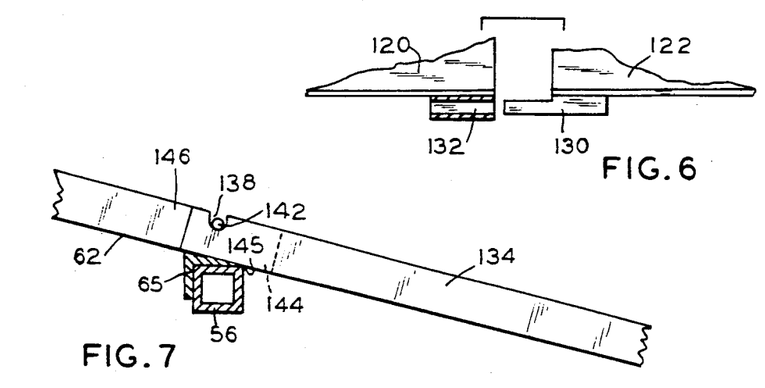
FIG. 6 illustrates an exploded top view of a means of attachment between ramp assembly sections.
FIG. 7 illustrates a side view of the attachment of guide rail and guide rail extension as seen at line 7—7 of FIG. 4.
Figure 8:
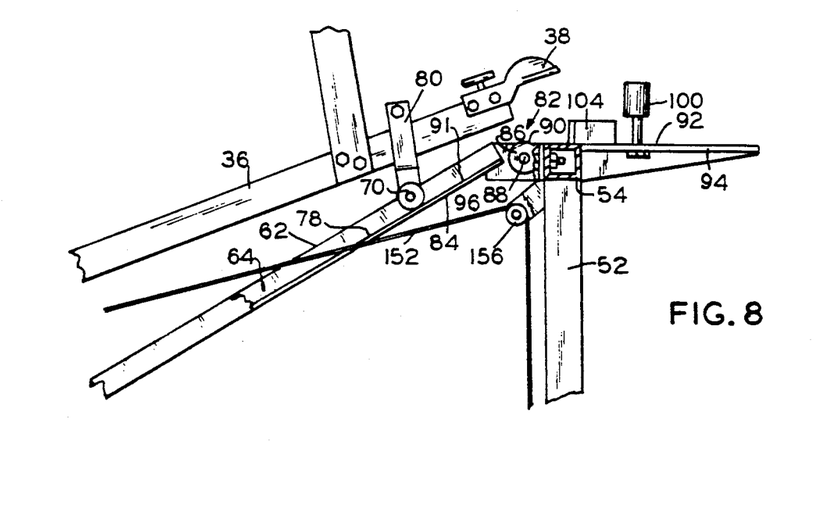
FIG. 8 illustrates a side view of trailer tongue support upon the guide rail of the loader and carrier apparatus.
Figure 9:
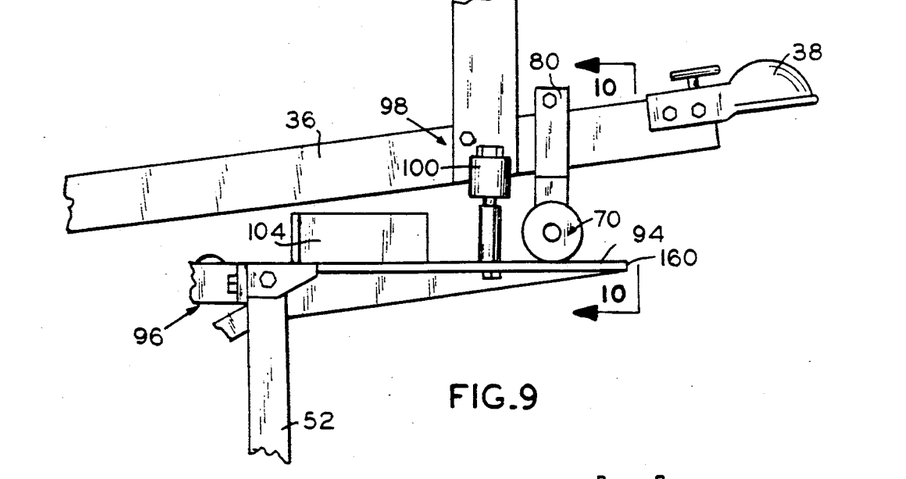
FIG. 9 illustrates a side view of trailer tongue support upon the forward support platform of the loader and carrier apparatus.
Figure 10:
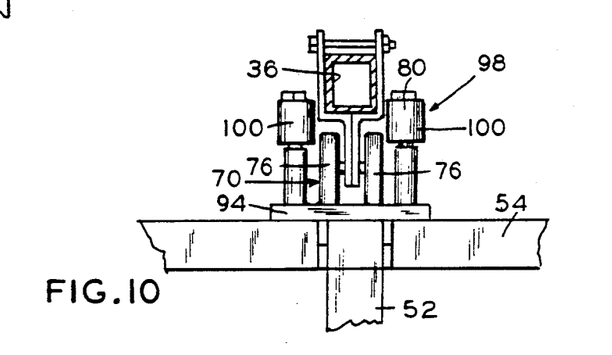
FIG. 10 illustrates a front view of trailer tongue support upon the forward support platform, as seen at line 10—10 of FIG. 9.

Turning now to the drawings, there is shown in FIG. 1 the loader and carrier apparatus for boat and trailer 10, mounted on a full size pickup truck 12 and carrying in traveling position a two-wheel boat trailer 14 loaded with a boat 16. The standard full-size pickup truck 12 includes a cargo box 20 having a floor 22, a fixed front wall 24, two fixed side walls 26, and a hinged tailgate 30. The two side walls 26 each have a plurality of stake pockets 32, normally three, located along the top edge 34 thereof.

A conventional boat trailer 14 for hauling 14- to 16-foot boats 16 includes a frame 35 supported by two wheels 37 and an elongated tongue 36 extending to the front upon the end of which is mounted a towing hitch 38.

The loader and carrier apparatus for boats and trailers 10 includes a support framework 40 which serves to support the remaining components of the loader and carrier apparatus 10. The support framework 40 includes two elongated side rail members 42, each formed to lay horizontally atop and be supported only by a side wall 26 of the cargo box 20. Extending vertically downwards from each of the horizontal side rail members 42 are a plurality of, normally two or three, stubs 44 which engage the stake pockets 32 in side walls 26. A front lower cross member 46, is formed to lay atop and be supported only by the front wall 24 of the cargo box 20. The side rail members 42 and the front lower cross member 46 are rigidly joined, as by welding, to form a U-shaped support framework 40 which provides the only contact and support for the loader and carrier apparatus 10 upon the pickup truck 12.

A front framework 48, includes two (2) front side members 50 and a front center member 52 rigidly joined, as by welding, to the front lower cross member 46 of the support framework 40 and which extend upwards to rigidly join and support a front top cross member 54 which extends horizontally above the front lower cross member 46. The rigid combination of the support framework 40 and the front framework 48 may be installed or removed as a unit when needed, or may remain atop the cargo box 20 of the pickup truck 12 when not in use. The framework of 40 and 48, when left on the pickup truck 12, provides negligible restriction to the original carrying capacity of the truck 12, the frameworks 40, 48 serving only as a minimal vertical extension of the sidewalls 26 and a protective vertical extension of the front wall 24 of the cargo box 20. Steel 2-inch by 2-inch tubing of 0.095-inch thickness is preferred for the support framework 40 and front framework 48 except for the front center member 52 which preferably is constructed of 1.5-inch by 3-inch steel tubing of 0.120-inch wall thickness.

Additional components of the loader and carrier apparatus 10 are added to the support and front frameworks, 40 and 48, to provide a capability for loading and carrying trailers 14 with boats 16. A pair of spaced rear cross members 56 and 58 are removably attached to the side rail members 42 and extend horizontally between the side rail members 42 above the floor 22 of the cargo box 20. Rear cross member 56 is attached proximate the rear 60 of the side rail members 42 while rear cross member 58 is attached in a position parallel to and forward of cross member 56. The manner of attachment to the side rail members 42 may be by use of a downward facing section of channel 59, as illustrated.

A guide rail 62 in channel form with legs 64 extending upwards, is removably attached, as by angle member 65, to the center of the rear cross member 56 and extends upwardly and forward to a removable central attachment on the front top cross member 54. A preferred form of the guide rail 62 includes two sections of 1½-inch steel angle spaced as to provide a longitudinal slot 66 along its length, thereby providing centered access for the winch cable 152 as described below.

A first roller assembly 68, having a roller 70 rotating about a transverse axis of rotation 72, is attached to the tongue 36 of the boat trailer 14 proximate its forward end 74 so that it extends downward in a position to engage the guide rail 62 during the initial portion of the loading sequence or the final portion of the unloading sequence, described later. The roller 70 is sized to fit within the channel legs 64 of the guide rail 62, the channel legs 64 thereby restricting lateral movement of the tongue 36. The roller 70 may, if desired, consist of a pair of roller elements 76, each of which ride on the portion 78 of guide rail 62 separated by the longitudinal slot 66. The attachment of the roller assembly 68 to the trailer tongue 36 may be by any of a number of conventional means including the illustrated bolted clamp mechanism 80 which surrounds the tongue 36.

A second horizontal roller assembly 82 is mounted to the guide rail 62 proximate its forward, upper end 84 where it attaches to the front top cross member 54. The roller 86, rotating about a transverse axis of rotation 88, is positioned so that its load-bearing surface 90 extends above the riding surface 91 of the guide rail 62, and also above the upper surface 92 of the forward support platform 94, described below. This horizontal roller assembly 82 is formed and positioned to support the tongue 36 of the boat trailer 14 when the first horizontal roller assembly 68 is not in contact with the guide rail 62 during the loading, unloading, and carrying processes.

A forward support platform 94 is attached to the forward, upper end 84 of the guide rail 62 at its junction 96 with the front top cross member 54 and extends horizontally forward from the junction 96. The forward support platform 94 forms a platform of limited length, extending approximately ten inches forward of the front top cross member 54, upon which the first roller assembly 68 may ride forward to facilitate the transition of support to the tongue 36. Between the first roller assembly 68 and the second roller assembly 82. The forward support platform 94 additionally serves the purpose of providing a base for a lateral guide assembly 98, mounted thereon. The lateral guide assembly 98 includes two spaced vertical roller assemblies 100 having vertical axes of rotation 102, so that when the tongue 36 is located between the vertical roller assemblies 100, they provide lateral guidance thereto. Also located on the forward support platform 94 are two angled stop plates 104, converging at their forward ends 105, yet spaced thereat to receive the tongue 36 of the trailer 14. The orientation of the stop plates 104 conforms with the corresponding orientation of the diverging forward trailer frame members 108 extending outwards and rearwardly from the tongue 36. The purpose of the stop plates 104 is to provide a forward stop location for the trailer 14, where trailer frame members 108 abut against the stop plates 104 to preclude further forward movement during the loading process.

Two wheel rest plates 110, supported by vertical support members 112 extending upwardly from the first and second rear cross members 56 and 58, are spaced apart corresponding to the separation of the wheels 37 of the trailer 14. The wheel rest plates 110 are utilized to support the wheels 37 of the trailer when the trailer 14 is in the fully loaded position and may be solid or formed of expanded metal expending between the 1½-inch angle members. The preferred orientation of the wheel rest plates 110 is inclined, with their front ends elevated in a continuation of the wheel ramp assemblies 114.

A pair of detachable ramp assemblies 114 are attached to and extend from the wheel rest plates 110 to the ground 116. It is preferred that each ramp assembly 114 be formed with two mutually detachable ramp members 120 and 122 so that the ramp assembly 114 may be separated for easy storage within the cargo box 20 of the pickup 16. Additionally at times it may be convenient for the user to operate the truck 12 with the tailgate 30 In a lowered position with shorter, e.g. five-foot, ramp sections 120 and the guide rail extension 134, in place, and then install the longer, e.g. eight-foot, ramp sections 122 when needed, as at launching or loading. The preferred arrangement thus includes a shorter upper ramp section 120, having a downward extending perpendicular tongue 124 which fits into a slot 126 formed at the back portion 128 of the wheel rest plate 110. The longer lower ramp section 122 is attached to the upper ramp section 120 by means of opposing longitudinal side projections 130 extending into corresponding side apertures 132 on the upper ramp section 120. As with the wheel rest plates 110, the ramp sections 120 and 122 may be formed of expanded metal extending between the 1½-inch angle members.

A guide rail extension 134, similar to the guide rail 62, in channel form with legs 136 extending upwards for restriction of lateral movement of the first roller assembly 68, forms a continuation of guide rail 62, extending longitudinally rearward therefrom. The guide rail extension 134 engages the guide rail 62 by means of a front, top opening slot 138 formed in each side of the extension 134, which slots 138 engage with projections 142 extending from opposing sides of the lower end 144 of the guide rail 62. This attachment combines with contact at 145 by the guide rail extension with the rear cross member 56 to support the guide rail extension 134 at its upper end 146 without further contact with the pickup truck 12.

A winch assembly 147 is utilized to load and unload the trailer 14 aboard the pickup truck 12. Preferably, winch 148, powered by an electric self-locking motor 150 using the pickup truck's 12 electric power, is mounted on the front center member 52 beneath the junction 96 of the guide rail 62 and the front top cross member 54. A cable 152 extends from the winch 148, passes upward and through a change of direction pulley 156 located just below the junction 96 and thence rearward, through the slot 66 in the guide rail 62, to a connection upon the trailer frame 35 proximate the wheels 37 of the trailer 14.

Figures 11, 12:
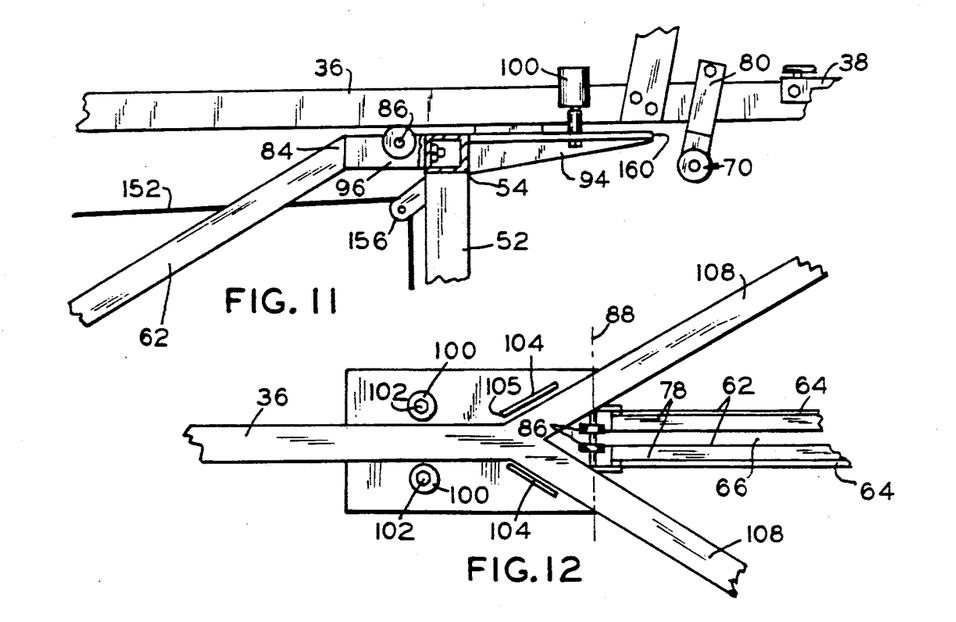
FIG. 11 illustrates a side view of trailer tongue support by a second roller assembly when a first roller assembly is clear of the forward support platform.
FIG. 12 illustrates a top view of the forward portion of the trailer frame as seated against stop plates mounted atop the forward support platform, as seen at line 12—12 of FIG. 1.

The operation of the loader and carrier apparatus for boats and trailers 10 is quick and simple. With the detachable ramp assemblies 114 and guide rail extension 134 in place and the truck 12 aligned ahead of the boat trailer 14, the winch cable 152 is extended and attached to the trailer frame 35 proximate the wheels 37. The trailer tongue 36 is manually lifted so that the first horizontal roller assembly 68 engages the lower end 158 of the guide rail extension 134. Upon activation of the winch motor 150, the cable 152 draws the trailer 14, with boat 16, forward so that the wheels 37 run up the ramp assemblies 114. As the cable 152 continues to draw the trailer 14 forward and up the ramp assemblies 114, the trailer tongue 36 and first roller assembly 68 advances up the guide rail extension 134, onto the guide rail 62. At the top of the guide rail 62, the first roller assembly 68 proceeds on to the short horizontal forward support platform 94, causing the trailer tongue 36 to lower its rate of climb, so that the underside of the tongue 36 itself comes into contact with the second roller assembly 82. When the first roller assembly 68 passes the forward end 160 of the platform 94, the tongue 36 is entirely supported by the second roller assembly 82. FIGS. 8 through 12 illustrate views of various positions of tongue support. At the tongue-lowered position, as seen in FIG. 11, the vertical roller assemblies 100 of the lateral guide assembly 98 direct the tongue 36 straight forward. The trailer wheels 37 continue to rise along the ramp assemblies 114, with the tongue 36 supported by the second roller assembly 82, until, as the boat 16 and trailer 14 become horizontal, the trailer wheels 37 arrive at the inclined wheel rest plates 110 and the forward frame members 108 of the trailer 14 seat themselves against the stop plates 104 positioned upon the forward support platform 94. Upon securing the trailer 14 aboard the apparatus 10 in a conventional manner, and removing and storing the ramp assemblies 114 and guide rail extension 134 in the box 20 of the pickup 12, the boat 16 and trailer 14 are ready for transport. Unloading the boat 16 and trailer 14 is equally quick and simple, following the reverse of the above described procedure.

The design and preferred construction of the loader and carrier apparatus 10 is such that, when not carrying a boat 16 and trailer 14, a portion of the apparatus 10 may be readily removed from the support framework 20 and front framework 48, so that the pickup truck 12 may he operated in a conventional manner without loss of cargo-carrying capability and without unsightly supporting projections extending toward the front of the vehicle. An intermediate disassembly involves only the detachment of the guide rail 62 and forward suppor platform 94 from the front top cross member 54 and the detachment of the first and second rear cross members 56 and 58 from the side rail members 42. The detached guide rail 62 and rear cross members 56 and 58 with wheel rest plates 110 attached can be removed as a unit or, preferably, further disassembled by detaching the wheel rest plates 110 and their vertical support members 112 and the guide rail 62 from the rear cross members 56 and 58. If necessary, the winch assembly 147 may be removed from the front framework 48, although such removal normally would be desirable only if the winch assembly 147 interfered directly with the desired cargo-carrying capacity of the pickup truck 12. Thus, the preferred construction of the apparatus 10 makes the attachment of the guide rail 62 to the front top cross member 54 and to the first rear cross member 56, and the attachment of the wheel rest plates 110, through supports 112, to the first and second rear cross members 56 and 58, and the attachment of the first and second rear cross members 56 and 58 to the side rail member 42 to be readily removable, such as by connections utilizing bolts and nuts.

It is thought that the loader and carrier for boat and trailer of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

We claim:

1. A loader and carrier apparatus for boats and trailers, in combination with a boat trailer having two wheels and a tongue, and with a pickup truck with a cargo box having a floor, a fixed front wall, and two fixed side walls having a plurality of stake pockets located along the top thereof, the loader and carrier apparatus comprising:
    a. a support framework including:
        (1) two side rails members, each formed to lay atop and be supported by the side walls of the pickup truck cargo box, and to engage the stake pockets located therein, each side rail member having a front end and a rear end; and
        (2) a front lower cross member, formed to lay atop and be supported by the front wall of the pickup truck cargo box, and attached at its two opposing ends to the front ends of said two side rail members;
    b. a front framework, including:
        (1) two front side members and a front center member, each having an upper end and a lower end, which are attached at their lower ends to the support framework at the front lower cross member and extend upwards therefrom; and
        (2) a front top cross member, attached to the upper ends of the front side members and the front center member;
    c. a first rear cross member and a second rear cross member, attached to and extending horizontally between the two side rail members, the first rear cross member being attached to the side rail members proximate their rear ends and the second rear cross member attached in a position spaced forward from and parallel to the fist rear cross member
    d. a guide rail attached centrally to the fist rear cross member and extending upwardly and forward to a central attachment at the front top cross member;
    e. a guide rail extension, formed to attach to, and longitudinally extend rearward and downward from the lower end of the guide rail;
    f. a forward support platform attached to the guide rail at the junction of the guide rail and the front top cross member, and extending horizontally forward therefrom;
    g. a first horizontal roller assembly mounted on the tongue of the trailer and extending downwards therefrom, said fist horizontal roller assembly formed and positioned to engage said guide rail extension, guide rail, and forward support platform, thereby supporting, upon said guide rail extension, guide rail and forward support platform, the tongue of the trailer while so engaged;
    h. a second horizontal roller assembly, mounted upon the guide rail proximate its forward, upper end, which is formed and positioned to support the tongue o the trailer when the first horizontal roller assembly is into engaged upon the guide rail extension, guide rail, or forward support platform;
    i. said forward support platform having a front end, extending horizontally forward, from the junction of the guide rail and the front top cross member, that distance whereat, when the first roller assembly disengages from said front end of the platform, the second roller assembly will engage the tongue of the trailer;
    j. two wheel rest plates, positioned on supporting frames above, and supported by, the first and second rear cross members so as to provide support for the two wheel of the trailer when loaded upon the pickup truck;
    k. a pair of detachable ramp assemblies, extending longitudinally from the wheel rest plates to the ground; and 'l. a winch assembly.

2. A loader and carrier apparatus of boats and trailers, as recited in claim 1, wherein the two side rail members and the front lower cross member form the only contact and support for the loader and carrier apparatus upon the pickup truck.

3. A loader and carrier apparatus for boats and trailers, in combination with a boat trailer having two wheels and a tongue, and with a pickup truck with a cargo box having a floor, a fixed front wall, and two fixed side walls having a plurality of stake pockets located along the top thereof, the loader and carrier apparatus comprising:
    a. a support framework including:
        (1) two side rail members, each formed to lay atop and be supported by the side walls of the pickup truck cargo box, and to engage the stake pockets located therein, each side rail member having a front end and a rear end; and
        (2) a front lower cross member, formed to lay atop and be supported by the front wall of the pickup truck cargo box, and attached at its two opposing ends to the front ends of said two side rail members;
    b. a front framework, including:
        (1) two front side members and a front center member, each having an upper end and a lower end, which are attached at their lower end of the support framework at the front lower cross member and extend upwards therefrom; and
        (2) a front top cross member, attached to the upper ends of the front side members and the front center member;

c. a first rear cross member and a second rear cross member, attached to and extending horizontally between the two said rail members, the fist rear cross member being attached to the side rail members proximate their rear ends and the second rear cross member attached in a positions paced forward from and parallel to the fist rear cross member;

d. a guide rail attached centrally to the first rear cross member and extending upwardly and forward to a central attachment at the front top cross member;

e. a guide rail extension, formed to attach to, and longitudinally extend rearward and downward from the lower end of the guide rail;

f. a forward support platform attached o the guide rail at the junction of the guide rail and the front top cross member, and extending horizontally forward therefrom;

g. a first horizontal roller assembly mounted on the tongue of the trailer and extending downwards therefrom, said first horizontal roller assembly formed and positioned to eagle said guide rail extension, guide rail, and forward support platform, thereby supporting, upon said guide rail extension, guide rail, and forward support platform, the tongue of the trailer while so egged;

h. a second horizontal roller assembly, mounted upon the guide rail proximate its forward, upper end, which is formed and positioned to support the tongue of the trailer when the fist horizontal roller assembly is not engaged upon the guide rail extension, guide rail, of forward support platform;

i. said forward support platform having a front end, extending horizontally forward, from the junction of the guide rail and the front top cross member, that distance whereat, when the first roller assembly disengages from said front end of the platform, the second roller assembly will engage the tongue of the trailer;

j. a lateral guide assembly attached to the forward support platform and formed to provide limits of lateral movement to the trailer tongue when supported by the second horizontal roller assembly, said lateral guide assembly including two spaced roller assemblies having vertical axes of rotation, which, when the trailer tongue is located between said spaced roller assemblies, provide lateral guidance thereto;

k. two wheel rest plates, positioned on supporting frames above, and supported by, the first and second gear cross members so as to provide support for the two wheels of the trailer when loaded upon the pickup truck;

l. a pair of detachable ramp assemblies, extending longitudinally from the wheel rest plates to the ground; and m. a winch assembly.

4. A loader and carrier apparatus for boats and trailers, in combination with a boat trailer having two wheels and a tongue, and with a pickup truck with a cargo box having a floor, a fixed front wall, and tow fixed side walls having a plurality of stake packets located along the top thereof, the loader and carrier apparatus comprising:

a. a support framework including:
  (1) two side rail members, each formed to lay atop and be supported by the side walls of the pickup truck cargo box, and to engage the stake pockets located therein, each side rail member having a front end and a rear end; and
  (2) a front lower cross member, formed to lay atop and be supported by the front wall of the pickup truck cargo box, and attached at tis two opposing ends to the front ends of said two side rail members;

b. a front framework, including:
  (1) two front side members and a front center member, each having an upper end and a lower end, which are attached at their lower ends to the support framework at the front lower cross member and extend upwards therefrom; and
  (2) a front top ross member, attached to the upper ends of the front side members and the front center member;

c. a first rear cross member and a second rear cross member, attached to and extending horizontally between the two side rail members, the first rear cross member being attached to the side rail members proximate their rear ends and the second rear cross member attached in a position spaced forward from and parallel to the first rear cross member;

d. a guide rail attached centrally to the first rear cross member nd extending upwardly and forward to a central attachment at the front top cross member, said guide rail having a longitudinal slot formed along its length;

e. a guide rail extension, formed to attach to, and longitudinally extend rearward and downward from thrower end of the guide rail;

f. a forward support platform attached to the guide rail at the junction of the guide rail and the front top cross member, and extending horizontally formed therefrom;

g. a first horizontal roller assembly mounted on he tongue of the trailer and extending downwards therefrom, said first horizontal roller assembly a formed and positioned to engaged said guide rail extension, guide rail, and forward support platform, thereby supporting, upon said guide rail extension, guide rail, and forward support platform, the tongue of the trailer while so engaged;

h. a second horizontal roller assembly, mounted upon the guide rail proximate it forward, upper end, which is formed and positioned to support the tongue of the trailer when the first horizontal roller assembly si into engaged upon he guide rail extension, guide rail, or forward support platform;

i. said forward support platform having a front end, extending horizontal forward , from the junction of the guide rail and the front top cross cm ember, that distance whereat, when the first roller assembly disengages from said front end of the platform, the second roller assembly will engage the tongue of the trailer;

j. two wheel rest palates, positioned on supporting frames above, and supported by, the first and second rear cross members so as to provide support for the two wheels of the trailer when loaded upon the pickup truck;

k. a pair of detachable ramp assemblies, extending longitudinally from eh wheel rest plates to the ground; and l. a winch assembly which includes:
  (1) a winch mounted on the front framework directly beneath the guide rail; and (2) a cable which is threaded through said longitudinal slot in the guide rail, for attachment to the trailer.

5. A loader and carrier apparatus for boats and trailers, in combination with a boat trailer having two wheels and a tongue, and with a pickup truck with a cargo box having a floor, a fixed front walls and two fixed side walls having a plurality of stake pockets located along the top thereof, the loader and carrier apparatus comprising:

a. a support framework including:
   (1) two side rail members, each formed to lay atop and be supported by the side walls of the pickup truck cargo box, and to engage the stake pockets located therein, each side rail member having a front end and a rear end;
   (2) a front lower cross member, formed to lay atop and be supported by the front wall of the pickup truck cargo box, and attached at its two opposing ends to the front ends of said two side rail members; and
   (3) the two side rail members and the front lower cross member forming the only contact and support for the loader and carrier apparatus upon the pickup truck;

b. a front framework, including:
   (1) tow front side members and a front center member, each having an upper end and a lower end, which are attached at their lower ends to the support framework at the front lower cross member and extend upwards therefrom nd
   (2) a front top cross member, horizontally attached to the upper ends of the front side members and front center member;

c. a first rear cross member and a second rear cross member, attached to and extending horizontally between the two side rail members, the first rear cross member being attached to the side rail members proximate their rear ends and the second rear cross member attached in a position spaced forward from and parallel to the first rear cross member;

d. a guide rail attached centrally to the first rear cross member and extending upwaradly and forward to a central attachment at the front top cross member, said guide rail having a longitudinal slot formed along is length;

e. a guide rail extension, formed to attach to, and to longitudinally extend rearward and downward from e lower end of the guide rail;

f. a forward support platform attached to the guide rail at the junction of the guide rail and the front top cross member and extending horizontally forward therefrom;

g. a first horizontal roller assembly mounted on the tongue of the trailer and extending downwards therefrom, said first horizontal roller assembly formed and positioned to engage said guide rail extension, guide rail, and forward support platform, thereby supporting, upon said guide trail extension, guide rails nd forward support platform, the tongue of the trailer while so engaged;

h. a second horizontal roller assembly, mounted upon the guide rail proximate its forward, upper end, which is formed and positioned to support the tongue of the trailer when the first horizontal roller assembly is not engaged upon the guide rail extension, guide rail, or forward support platform;

i. said forward support platform having a front end, extending horizontally forward, from eh junction of the guide rail and the front top cross member, that distance whereat, when the first roller assembly disengages from said front end of the platform, the second roller assembly will engage the tongue of the trailer;

j. a lateral guide assembly mounted on the forward support platform to provide limits of lateral movement to the trailer tongue when the tongue si supported by the second horizontal roller assembly, the lateral guide assembly including two spaced roller assemblies having vertical axes of rotation, which, when the trailer tongue si located between said spaced roller assemblies, provide lateral guidance thereto;

k. two wheel rest plates, positioned on supporting frames above, and supported by, the first and second rear cross members so as to provide support for the two wheels of the trailer when loaded upon the pickup truck;

l. a pair of detachable ramp assemblies, extending longitudinally from the wheel rest plates to the ground, each ramp assembly formed as two mutually detachable members, so that the ramp assemblies may be easily carried within the cargo box of the pickup truck; and m. a winch assembly including a winch mounted on the front framework directly beneath the guide rail and a cable which is threaded through said longitudinal slot in the guide rail for attachment to the trailer.

* * * * *